(12) United States Patent
Ohmura et al.

(10) Patent No.: US 9,657,825 B2
(45) Date of Patent: May 23, 2017

(54) DRIVE DEVICE FOR VEHICLE

(71) Applicant: HONDA MOTOR CO., LTD., Tokyo (JP)

(72) Inventors: Jun Ohmura, Utsunomiya (JP); Shigeru Nakayama, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 505 days.

(21) Appl. No.: 14/378,368

(22) PCT Filed: Feb. 15, 2013

(86) PCT No.: PCT/JP2013/053738
§ 371 (c)(1),
(2) Date: Aug. 13, 2014

(87) PCT Pub. No.: WO2013/129144
PCT Pub. Date: Sep. 6, 2013

(65) Prior Publication Data
US 2015/0045170 A1  Feb. 12, 2015

(30) Foreign Application Priority Data

Feb. 27, 2012 (JP) .................. 2012-040022

(51) Int. Cl.
*F16H 48/10* (2012.01)
*F16H 48/42* (2012.01)
(Continued)

(52) U.S. Cl.
CPC ........... *F16H 48/10* (2013.01); *B60K 17/165* (2013.01); *B60K 17/356* (2013.01);
(Continued)

(58) Field of Classification Search
None
See application file for complete search history.

(56) References Cited

U.S. PATENT DOCUMENTS 4,826,190 A * 5/1989 Hartmann .............. B62K 3/005
280/236
5,480,362 A   1/1996 Tanaka et al.
(Continued)

FOREIGN PATENT DOCUMENTS

CN      1329220 A    1/2002
CN    101821532 A    9/2010
(Continued)

OTHER PUBLICATIONS

International Search Report dated Apr. 16, 2013, issued in corresponding application No. PCT/JP2013/053738.
(Continued)

*Primary Examiner* — Erin D Bishop
(74) *Attorney, Agent, or Firm* — Westerman, Hattori, Daniels & Adrian, LLP

(57) ABSTRACT

A drive device for a vehicle includes a first drive shaft, a second drive shaft, a differential mechanism, a speed reduction mechanism, and a case. The second speed reduction pinion gear of the speed reduction mechanism, and the first pinion gear and the second pinion gear of the differential mechanism are arranged out of phase in a rotation direction, and are arranged at a position in an axial direction so that at least any one of the first pinion gear and the second pinion gear of the differential mechanism overlaps with the second speed reduction pinion gear of the speed reduction mechanism.

20 Claims, 12 Drawing Sheets

(51) Int. Cl.
    *B60K 17/16*    (2006.01)
    *B60K 17/356*   (2006.01)
    *F16H 37/04*    (2006.01)
    *F16H 48/11*    (2012.01)
    *B60K 1/00*     (2006.01)

(52) U.S. Cl.
    CPC ........... *F16H 37/041* (2013.01); *F16H 48/42* (2013.01); *B60K 1/00* (2013.01); *B60K 2001/001* (2013.01); *F16H 48/11* (2013.01); *F16H 2048/106* (2013.01); *F16H 2200/0021* (2013.01); *F16H 2200/2097* (2013.01)

(56) References Cited

U.S. PATENT DOCUMENTS 6,378,638 B1     4/2002  Mizon et al.
7,384,357 B2 *   6/2008  Thomas ............... B60K 17/356
                                                    180/247

FOREIGN PATENT DOCUMENTS

| JP | 46-20523    | B1 | 6/1971  |
| JP | 4-231760    | A  | 8/1992  |
| JP | 6-81905     | A  | 3/1994  |
| JP | 2652281     | B2 | 9/1997  |
| JP | 2002-104001 | A  | 4/2002  |
| JP | 2002-235832 | A  | 8/2002  |
| JP | 2008-180309 | A  | 8/2008  |
| JP | 2009-162337 | A  | 7/2009  |

OTHER PUBLICATIONS

Office Action dated Feb. 29, 2016, issued in Chinese Patent Application No. 201380010625.X, with English translation. (10 pages).
European Search Report dated Oct. 14, 2015 issued in counterpart European patent application No. 13754302.1. (4 pages).

* cited by examiner

DRIVE DEVICE FOR VEHICLE

TECHNICAL FIELD OF THE INVENTION

The present invention relates to a drive device for a vehicle.

Priority is claimed on Japanese Patent Application No. 2012-040022, filed Feb. 27, 2012, the contents of which are incorporated herein by reference.

BACKGROUND ART

In the related art, a mechanism is known in which a double pinion type planetary gear is used as a speed reduction mechanism which can coaxially arrange an output shaft and an input shaft (for example, refer to Patent Document 1). As illustrated in FIG. 12, the double pinion type planetary speed reduction mechanism is configured so that a first pinion gear 301 and a second pinion gear 302 which are connected to each other are rotatably attached to a carrier 304 connected to an output shaft 303, the first pinion gear 301 meshes with a sun gear 306 connect to an input shaft 305, and the second pinion gear 302 meshed with a ring gear 308 fixed to a case 307.

In addition, Patent Document 1 discloses a drive device for a vehicle in which the double pinion type planetary speed reduction mechanism and bevel gear type differential mechanism are combined with each other.

As a differential mechanism between right and left wheels of a vehicle, a double pinion double sun type planetary differential mechanism is known in the related art (for example, refer to Patent Document 2). As illustrated in FIG. 13, the double pinion double sun type planetary differential mechanism is configured so that a left axle 401 and a right axle 402 are coaxially arranged a left wheel pinion gear 404 and a right wheel pinion gear 405 are rotatably attached to a carrier 403 connected to an input shaft, the left wheel pinion gear 404 and the right wheel pinion gear 405 mesh with each other, a left wheel sun gear 406 connected to the left axle 401 meshes with the left wheel pinion gear 404, and a right wheel sun gear 407 connected to the right axle 402 meshes with the right wheel pinion gear 405.

PRIOR ART DOCUMENTS

Patent Documents

Patent Document 1: Japanese Unexamined Patent Application, First Publication No. 2008-180309

Patent Document 2: Japanese Patent (Granted) Publication No. 2652281

SUMMARY OF THE INVENTION

Problems to be Solved by the Invention

However, the double pinion type planetary speed reduction mechanism has no sun gear meshing with the second pinion gear 302. Accordingly, a radially inner side portion of the second pinion gear 302 is a dead space, thereby causing a disadvantage to miniaturization of a device.

In addition, as disclosed in Patent Document 1, in a case where the double pinion type planetary speed reduction mechanism and the bevel gear type differential mechanism are arranged in combination with each other, a carrier of the double pinion type planetary speed reduction mechanism and a carrier of the bevel gear type differential mechanism are arranged side by side in a direction of the axle. Accordingly, the length in an axial direction increases, thereby causing a disadvantage to the miniaturization of the device.

The invention aims to provide a drive device for a vehicle which can shorten a dimension to the axial direction while including a speed reduction mechanism and a differential mechanism.

Means for Solving the Problems

In order to achieve the object, a drive device for a vehicle according to the invention employs the following.

(1) A drive device for a vehicle according to an aspect of the invention includes a first drive shaft and a second drive shaft whose axial ends are caused to oppose each other so as to be coaxially arranged; a differential mechanism that has a first sun gear which is connected to the first drive shaft; a second sun gear which is connected to the second drive shaft, a first pinion gear which meshes with the first sun gear, a second pinion gear which meshes with the second sun gear and the first pinion gear; and a carrier which rotatably supports the first pinion gear and the second pinion gear; a speed reduction mechanism that has an input sun gear which is connected to an input shaft, a first speed reduction pinion gear which meshes with the input sun gear and is rotatably supported by the carrier, a second speed reduction pinion gear which is connected to the first speed reduction pinion gear and is rotatably supported by the carrier and a ring gear which meshes with the second speed reduction pinion gear; and a case that encloses the differential mechanism and the speed reduction mechanism which are coaxially arranged, that rotatably supports the carrier, and to which the ring gear is fixed. The second speed reduction pinion gear of the speed reduction mechanism, and the first pinion gear and the second pinion gear of the differential mechanism are arranged out of phase in a rotation direction, and the second speed reduction pinion gear of the speed reduction mechanism, and the first pinion gear and the second pinion gear of the differential mechanism are arranged at a position in an axial direction so that at least any one of the first pinion gear and the second pinion gear of the differential mechanism overlaps with the second speed reduction pinion gear of the speed reduction mechanism.

(2) In the drive device for a vehicle according to the aspect of (1), a revolution outer diameter of the first pinion gear and the second pinion gear of the differential mechanism may be smaller than an inner diameter of the ring gear of the speed reduction mechanism, and a revolution inner diameter of the second speed reduction pinion gear of the speed reduction mechanism may be larger than an outer diameter of the first sun gear and the second sun gear of the differential mechanism.

(3) In the drive device for a vehicle according to the aspect of (1) or (2), the carrier may have a first carrier member, a second carrier member, and a third carrier member and the second carrier member may be configured to be interposed between the first carrier member and the third carrier member. The first pinion gear and the second pinion gear of the differential mechanism may be rotatably attached to the first carrier member and the second carrier member by being interposed therebetween. The first speed reduction pinion gear the second speed reduction pinion gear of the speed reduction mechanism may be rotatably attached to the first carrier member and the third carrier member by being interposed therebetween.

(4) The drive device for a vehicle according to any one of the aspects of (1) to (3) may further include a collar that is fixed to one end surface of the carrier so as to be radially overlapped with the first sun gear in order to regulate a movement of the first sun gear in the axial direction. The collar may include a locking portion which is radially overlapped with a shaft of the first pinion gear and the second pinion gear in the differential mechanism on an outward side of an axially direction of the shaft.

Effect of the Invention

According to the drive device for a vehicle of the above mentioned aspect (1) of the invention, the second speed reduction pinion gear of the speed reduction mechanism, and the first pinion gear and the second pinion gear of the differential mechanism are arranged out of phase in the rotation direction, and the second speed reduction pinion gear of the speed reduction mechanism, and the first pinion gear and the second pinion gear of the differential mechanism are arranged at the position in an axial direction so that at least any one of the first pinion gear and the second pinion gear of the differential mechanism overlaps with the second speed reduction pinion gear of the speed reduction mechanism. Therefore, the dimension in the axial direction of the drive device for a vehicle can be shortened, thereby enabling the device to be miniaturized.

According to the drive device for a vehicle of the above mentioned aspect (2) of the invention, it is possible to prevent radial interference between the first pinion gear and the second gear of the differential mechanism and the ring gear of the speed reduction mechanism, and it is possible to prevent radial interference between the second speed reduction pinion gear of the speed reduction mechanism and the first sun gear and the second sun gear of the differential mechanism.

According to the drive device for a vehicle of the above mentioned aspect (3) of the invention, the differential mechanism and the speed reduction mechanism can share the carrier when in use, thereby enabling the carrier to be reduced in weight and to be miniaturized.

According to the drive device for a vehicle of the above mentioned aspect (4) of the invention, the collar for regulating the movement in the axial direction of the first sun gear can regulate the movement in the axial direction of the shaft of the first pinion gear and the second pinion gear in the differential mechanism. As a result, there is no need to provide a dedicated member (for example, pin or clip) for regulating the movement in the axial direction of the shaft of the first pinion gear and the second pinion gear, thereby allowing a reduced number of components and a reduced number of manufacturing processes.

DESCRIPTION OF EMBODIMENTS

Hereinafter, an embodiment of a drive device for a vehicle according to the invention will be described with reference to FIGS. 1 to 11.

Figure 1:
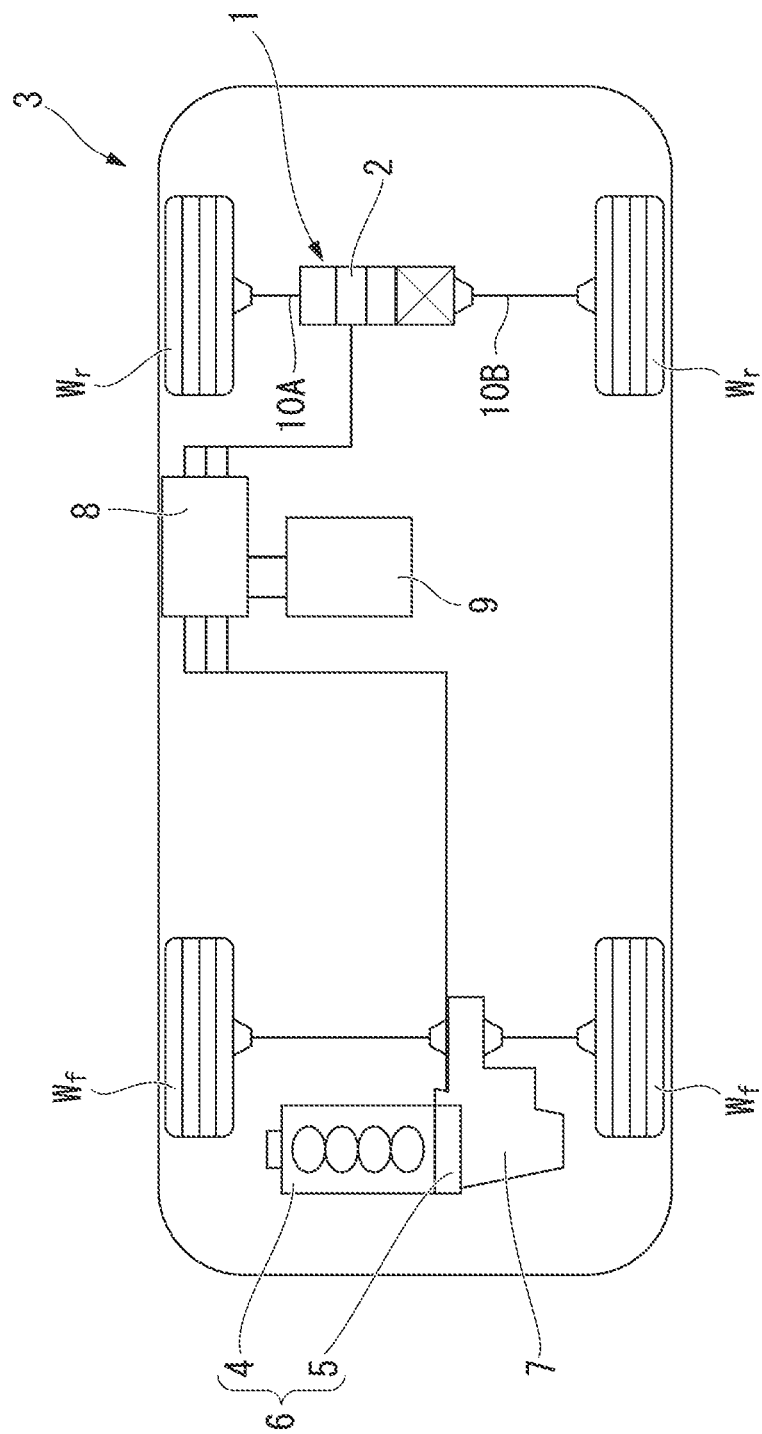
FIG. 1 is a schematic configuration diagram illustrating a layout of a vehicle on which a drive device for a vehicle according to an embodiment of the invention is mounted.

A drive device for a vehicle (hereinafter, simply referred to as a drive device) 1 according to the invention uses an electric motor 2 as a drive source for driving vehicle wheels, and for example, is used in a vehicle 3 having a drive system as illustrated in FIG. 1.

The vehicle 3 illustrated in FIG. 1 is a hybrid vehicle which has a drive unit 6 to which an internal combustion engine 4 and an electric motor 5 is connected in series. Power of the drive unit 6 is transmitted to a front wheel Wf side via a transmission 7. In contrast, power of the drive device 1 according to the invention which is disposed separately from the drive unit 6 is transmitted to a rear wheel Wr side. The electric motor 5 of the drive unit 6 and the electric motor 2 of the drive device 1 of the rear wheel Wr side are connected to a battery 9 via a power drive unit (PDU) 8. Power supply from the battery 9 and energy regeneration from the respective electric motors 5 and 2 to the battery 9 are performed via the PDU 8.

Figure 2:
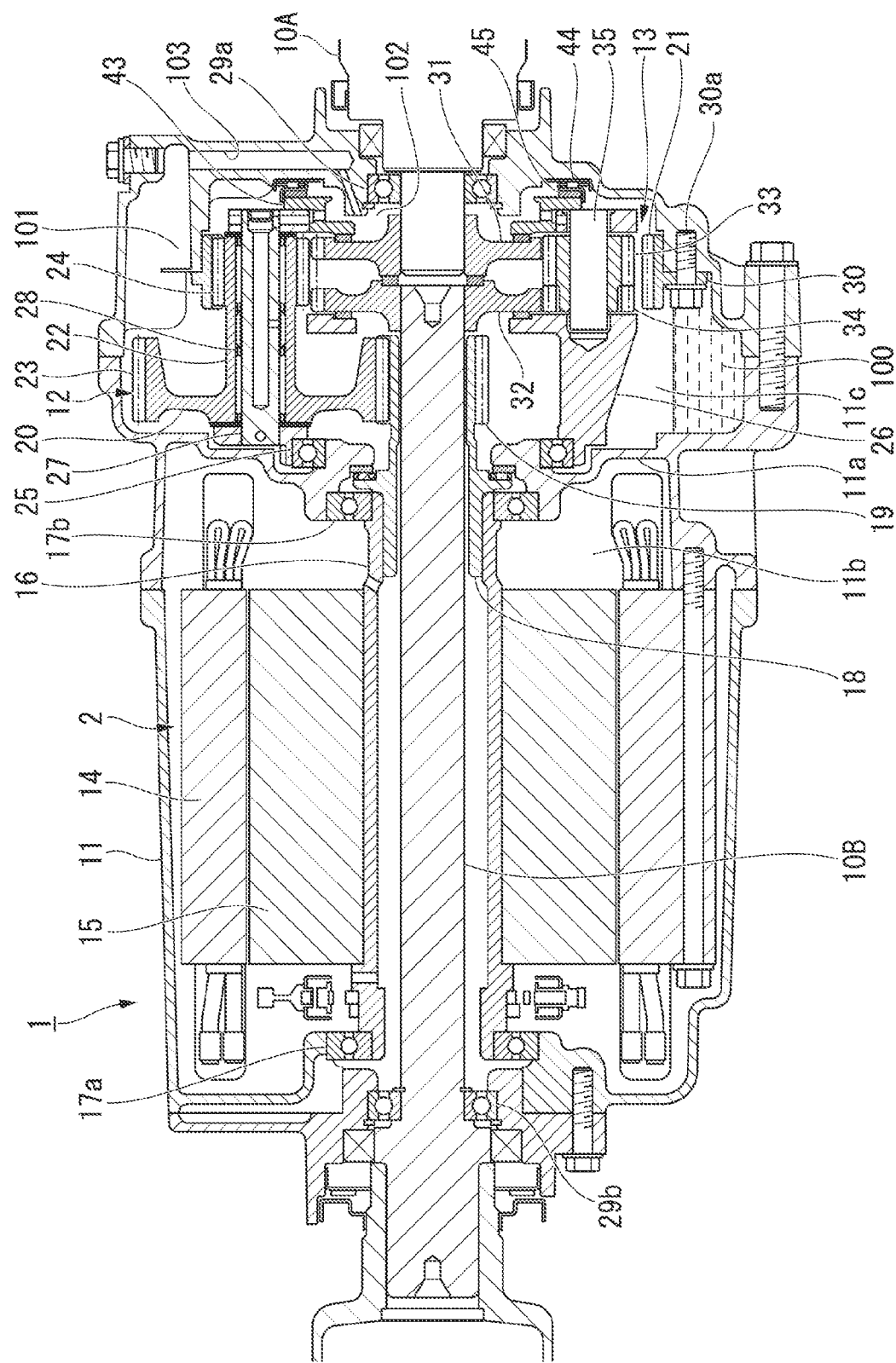
FIG. 2 is an overall vertical cross-sectional view of the drive device for a vehicle according to the embodiment.

FIG. 2 illustrates an overall vertical cross-section vies of the drive device 1. In FIG. 2 reference numerals 10A and 10B represent a right axle and a left axle of the rear wheel side of the vehicle, respectively. The axles 10A and 10B are configured so that axial ends thereof are caused to oppose each other so as to be coaxially arranged.

In the following description, the same direction as an axial direction of the axles 10A and 10B is simply referred to as art "axial direction". With regard to a right and left direction, a side where the right axle (first drive shaft) 10A is arranged is referred to as a "right side", and a side where the left axle (second drive shaft) 10B is arranged is referred to as a "left side".

A case 11 of the drive device 1 is disposed to cover an outer peripheral side of the left axle 10B from a substantially intermediate position between both axles 10A and 10B, and is fixedly supported by a rear lower portion of the vehicle 3 (refer to FIG. 1) together with the axles 10A and 10B. Respective one end portions of the axles 10A and 10B are rotatably supported by the case 11 via bearings 29a and 29b.

In addition, the case 11 is entirely formed in a substantially cylindrical shape. An interior of the case 11 is divided into an electric motor chamber 11b and a gear chamber 11c by a partition portion 11a which is formed in middle portion of the axial direction. The electric motor 2 for driving the axles is accommodated in the electric motor chamber 11b. A reduction gear 12 (speed reduction mechanism) which reduces a speed of drive rotation of the electric motor 2 and a differential gear (differential mechanism) 13 which distributes an output of the reduction gear 12 to the right and left axles 10A and 10B are accommodated in the gear chamber 11c. Both of these reduction gear 12 and differential gear 13 are arranged coaxially with the axles 10A and 10B.

A stator 14 of the electric motor 2 is fixed so the electric motor chamber 11b of the case 11. An annular rotor 15 is rotatably arranged on an inner peripheral side of the stator 14. A cylindrical shaft 16 which surrounds an outer peripheral side of the left axle 10B is coupled to an inner peripheral portion of the rotor 15. The cylindrical shaft 16 is arranged concentrically with the left axle 10B, is supported to be relatively rotatable with respect to the left axle 10B, and is rotatably supported by the case 11 via bearings 17a and 17b.

An input shaft 18 of the reduction gear 12 is fixedly fitted to an inner side of a right end portion of the cylindrical shaft 16. The input shaft 18 has a cylindrical shape which allows the left axle 10B to penetrate and is attached so as to be relatively rotatable with respect to the left axle 10B. A tight end portion of the input shaft 18 penetrates the partition portion 11a and enters the gear chamber 11e. A right end portion of the left axle 10B also penetrates the input shaft 18 and enters the gear chamber 11e.

Figure 3:
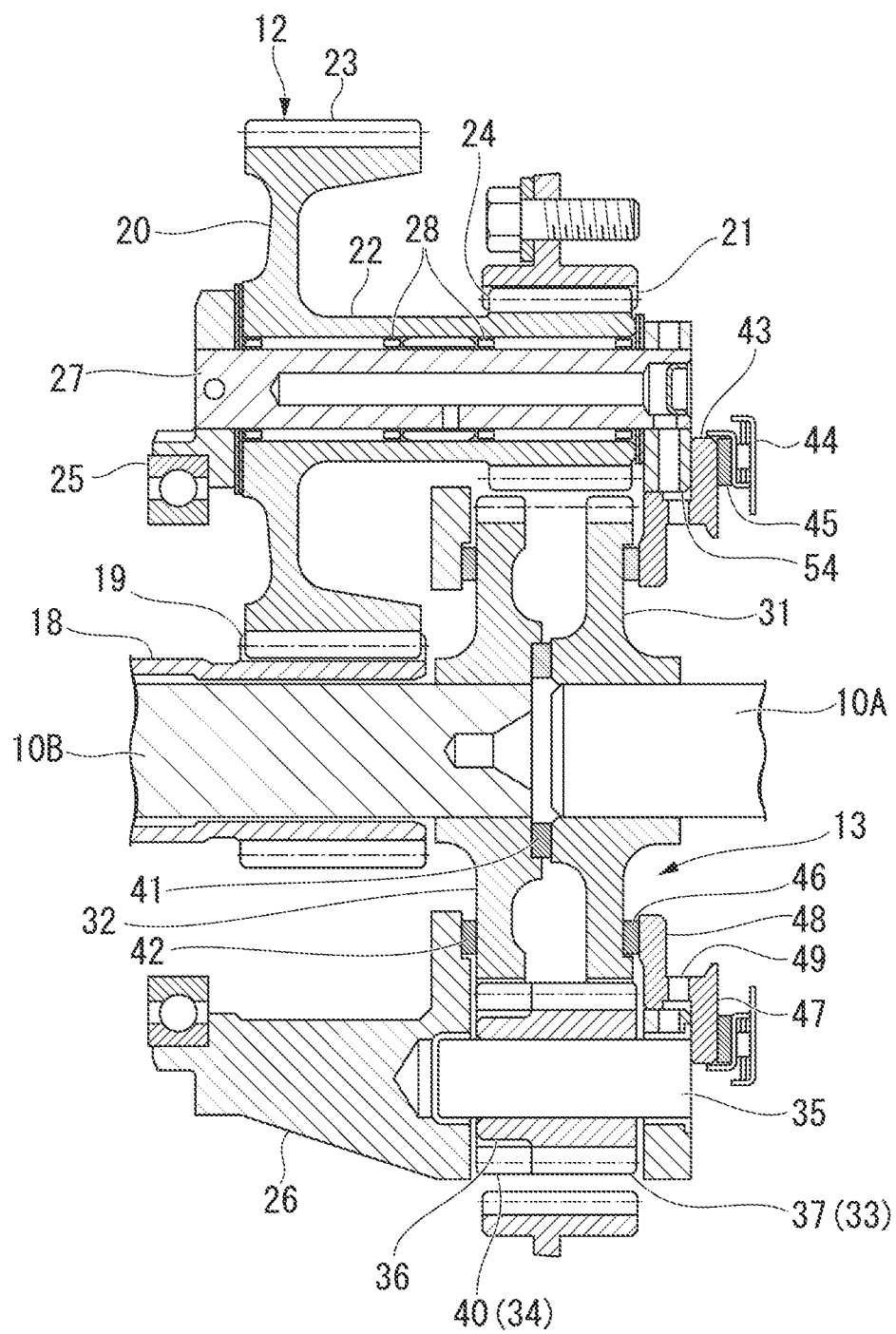
FIG. 3 is a cross-sectional view of a speed reduction mechanism and a differential mechanism in the drive device for a vehicle according to the embodiment.

As illustrated in FIGS. 2 and 3, the reduction gear 12 is a planetary type reduction gear, and includes a sun gear (input sun gear) 19 which is integrally formed in the right end portion of the input shaft 18, three pinions 20 which are arranged on a radially outer side of the sun gear 19 and mesh with the sun gear 19, a ring gear 21 which is arranged on a radially outer side of the pinions 20 and meshes with the pinions 20, and a carrier 26 which rotatably supports the pinions 20 and functions as an output shaft of the reduction gear 12.

The ring gear 21 is arranged concentrically with the input shaft 18, and is fixed to the right end side of the gear chamber 11e. An attachment flange 30 formed on the outer peripheral portion of the ring gear 21 is fixedly fastened to the case 11 via a bolt 30a. That is, the ring gear 21 is non-rotatably fixed to the case 11.

The carrier 26 is arranged concentrically with the input shaft 18, and is rotatably supported by the case 11 via bearing 25 in a left end portion of the gear chamber 11e.

Three pinions 20 are rotatably attached to the carrier 26, and are arranged a an interval of 120 degrees in a circumferential direction of the carrier 26. The pinion 20 includes a hollow cylindrical-shaped shaft portion 22, a first speed reduction pinion gear 23 which is formed integrally with the shaft portion 22 at a left end portion of the shaft portion 22 in the axial direction, and a second speed reduction pinion gear 24 which is formed integrally with the shaft portion 22 at a right end portion of the shaft portion 22 in the axial direction. That is, the first speed reduction pinion gear 23 and the second speed reduction pinion gear 24 are disposed in the pinion 20 so as to be apart from each other in the axial direction.

A pinion shaft 27 whose shaft center is arranged to be parallel to a shaft center of the input shaft 18 and which is fixed to the carrier 26 is inserted into the shaft portion 22 of the respective pinions 20. The pinion 20 is rotatably supported by the pinion shaft 27 via a bearing 28 interposed between the shaft portion 22 and the pinion shaft 27. In other words the first speed reduction pinion gear 24 and the second speed reduction pinion gear 24 are rotatably supported by the carrier 26.

The first speed reduction pinion gear 23 has a diameter larger than that of the second speed reduction pinion gear 24. The first speed reduction pinion gear 23 meshes with the sun gear 19, and the second speed reduction pinion gear 24 meshes with the ring gear 21.

In the reduction gear 12, the rotation of the input shaft 18 is transmitted to the pinion 20 via sun gear 19 and the first speed reduction pinion gear 23, and the rotation of the pinion 20 is transmitted to the carrier 26 via the second speed reduction pinion gear 24 and the ring gear 21. In this manner, the speed is reduced. That is, the carrier 26 functions as an output shaft of the reduction gear 12.

In addition, the carrier 26 also functions as an input shaft of a differential gear 13.

The differential gear 13 includes a right sun gear (first sun gear) 31 which is fixedly connected to a lift end portion of the right axle 10A, a left sun gear (second sun gear) 32 which is fixedly connected to a right end portion of the left axle 10B, a right pinion gear (first pinion gear) 33 which is arranged on a radially outer side of the right sun gear 31, meshes with the right sun gear 31 and is rotatably attached to the carrier 26, and a left pinion gear (second pinion gear) 34 which is arranged on a radially order side of the left sun gear 32, meshes with the left sun gear 32 and the right pinion, gear 33 and is rotatably attached to the carrier 26.

The right sun gear 31 and the left sun gear 32 have the same outer diameters as each other.

Figure 5:
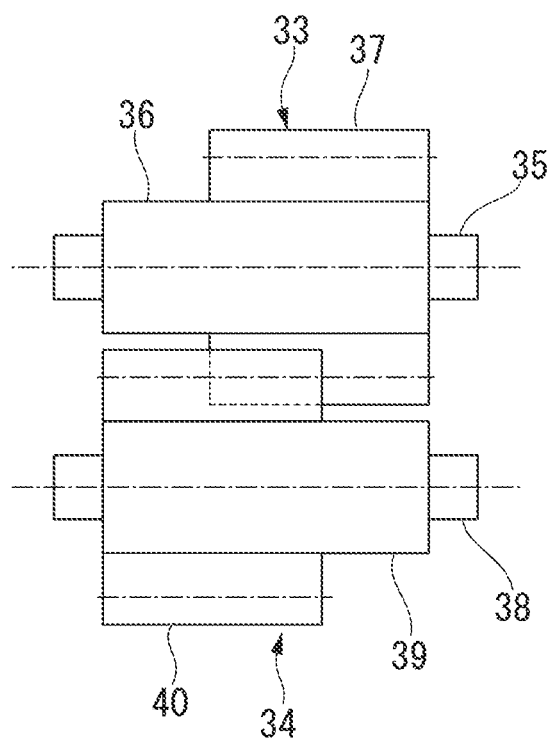
FIG. 5 illustrates a meshing state of a pinion gear of the differential mechanism.

The differential gear 13 has three sets of the right pinion gear 33 and the left pinion gear 34 which mesh with each other as described above. The respective sets are arranged in the carrier 26 at an interval of 120 degrees in the circumferential direction. Hereinafter, one set of the right pinion gear 33 and the left pinion gear 34 will be described in detail. As illustrated in FIG. 5, the right pinion gear 33 and the left pinion gear 34 have shapes which are bilaterally symmetrical to each other, but are formed to have the same dimension. The right pinion gear 33 includes a shaft portion 36 through which a pinion shaft 35 fixedly passes, and a gear portion 37 which is formed integrally with the shaft portion 36 by excluding a left end portion of the shaft portion 36. The left pinion gear 34 includes a shaft portion 39 through which a pinion shaft 38 fixedly passes, and a gear portion 40 which is formed integrally with the shaft portion 39 by excluding a right end portion of the shaft portion 39.

The pinion shafts 35 and 38 are arranged so that the shaft center thereof is parallel to the shaft center of the axles 10A and 10B, and both ends thereof are rotatably supported by the carrier 26. In other words, the right pinion gear 33 and the left pinion gear 34 are rotatably supported by the carrier 26. Then, the left end portion of the gear portion 37 of the right pinion gear 33 meshes with the right end portion of the gear portion 40 of the left pinion gear 34. In addition, the right sun gear 31 meshes with the right end portion of the gear portion 37 of the right pinion gear 33, and the left sun gear 32 meshes with the left end portion of the gear portion 40 of the left pinion gear 34. Then, the right sun gear 31 passes through a portion having no gear portion 40 in the shaft portion 39 of the left pinion gear 34, thereby preventing interference between the right sun gear 31 and the left pinion gear 34. Similarly, the left sun gear 32 passes through a portion having no gear portion 37 in the shaft portion 36 of the right pinion gear 33.

Then, the second speed reduction pinion gear 24 of the reduction gear 12 is arranged so that the second speed reduction pinion gear 24 revolves at a radially outer side of the right sun gear 31 and the left sun gear 32 of the differential gear 13, and the right pinion gear 33 and the left pinion gear 34 of the differential gear 13 are arranged so that the right pinion gear 33 and the left pinion gear 34 revolves at a radially inner side of the ring gear 21 of the reduction gear 12. For this reason, an inner diameter during the revolving of the second speed reduction pinion gear 24 (hereinafter, referred to as a revolving inner diameter) is set to be larger than an outer diameter of the right sun gear 31 and the left sun gear 32 of the differential gear 13, and an outer diameter during the revolving of the right pinion gear 33 and the left pinion gear 34 of the differential gear 13 (hereinafter, referred to as a revolving outer diameter) is set to be smaller than an inner diameter of the ring gear 21 of the reduction gear 12.

Figure 4:
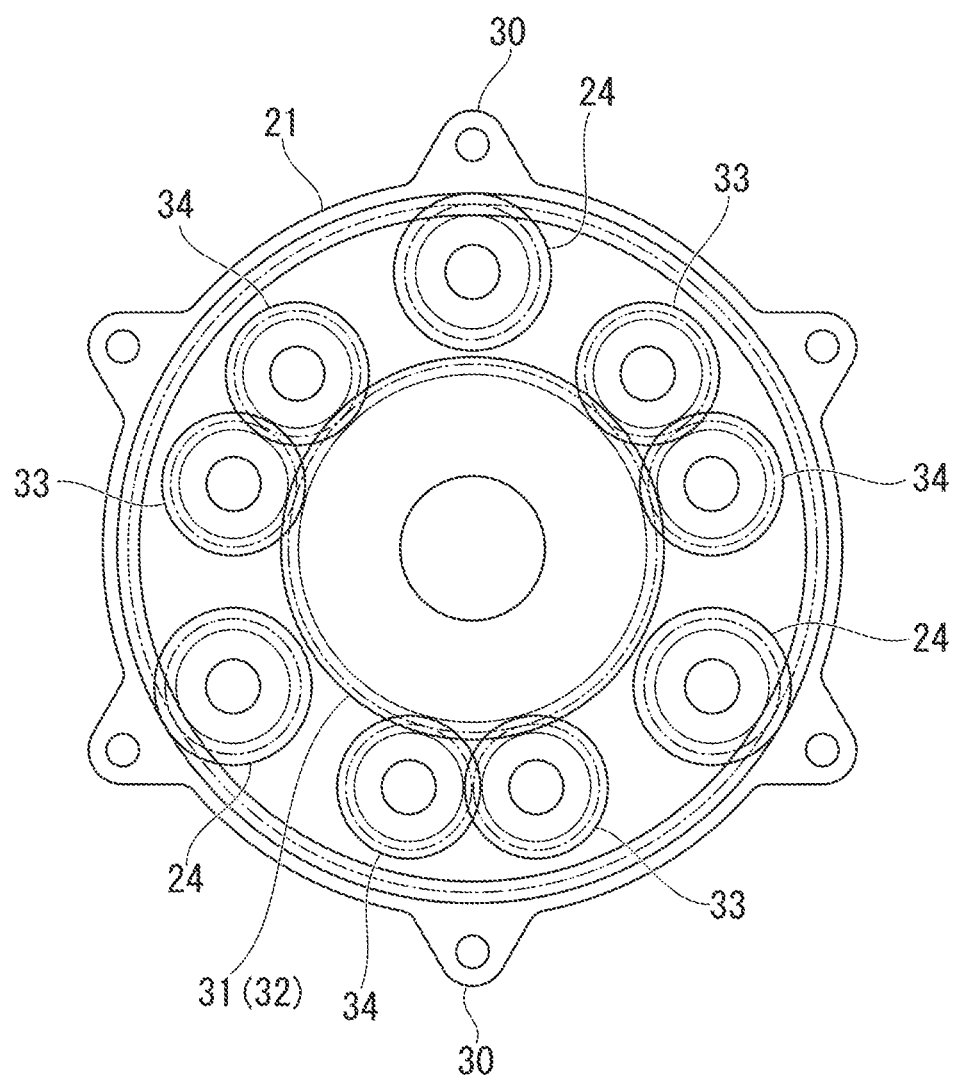
FIG. 4 is a front view of the speed reduction mechanism and the differential mechanism.

In addition, the second speed reduction pinion gear 24 of the reduction gear 12, and the right pinion gear 33 and the left pinion gear 34 of the differential gear 13 are arranged out of phase by 60 degrees in the circumferential direction of the carrier 26 (that is, rotation direction of the carrier 26) as illustrated in FIG. 4, and the second speed reduction pinion gear 24 of the reduction gear 12, and the right pinion gear 33 and the left pinion gear 34 of the differential gear 13 are arranged at positions in the axial direction so that they overlap with each other as illustrated in FIGS. 2 and 3.

A washer 41 which enables both sun gears 31 and 32 to be relatively rotated and regulates these not to be moved in the axial direction is interposed between opposing surfaces in which the right sun gear 31 and the left sun gear 32 oppose each other.

A washer 42 which enables the left sun gear 32 to be relatively rotated with respect to the carrier 26 and regulates the left sun gear 32 not to be moved in the axial direction is interposed between a left end surface of the left sun gear 32 and the carrier 26.

Furthermore, a cylindrical collar 43 is fixed to a right end opening 54 of the carrier 26, and the collar 43 is rotatably supported by the case 11 via a thrust bearing 44 and a shim 45. A washer 46 which enables the right sun gear 31 to be relatively rotated with respect to the collar 43 and regulates the right sun gear 31 not to be moved in the axial direction is interposed between the collar 43 and a right end surface of the right sun gear 31.

Instead of the washers 41, 43 and 46, a thrust bearing can also be used.

In the differential gear 13, when the right axle 10A and the left axle 10B rotate at the same rotational speed without any rotational difference, the right sun gear 31 and the left sun gear 32 rotate at the same rotational speed. Accordingly, the right pinion gear 33 and the left pinion gear 34 do not relatively rotate with respect to the carrier 26. In this manner, it is possible to transmit the drive force input for the carrier 26 to the right axle 10A and the left axle 10B without causing a rotational difference between the right axle 10A and the left axle 10B.

In contrast, when a rotational difference occurs between the right axle 10A and the left axle 10B, the right sun gear 31 and the right axle 10A rotate at the same rotational speed and the left sun gear 32 and the left axle 10B rotate at the same rotational speed. Accordingly, the right pinion gear 33 and the left pinion gear 34 mesh with each other so as to rotate in directions opposite to each other, and relatively rotate with respect to the carrier 26 in accordance with the rotational difference between the right sun gear 31 and the left sun gear 32. In this manner, it is possible to transmit the drive force input from the carrier 26 to the right axle 10A and the left axle 10B while causing the rotational difference between the right axle 10A and the left axle 10B.

Figure 6:
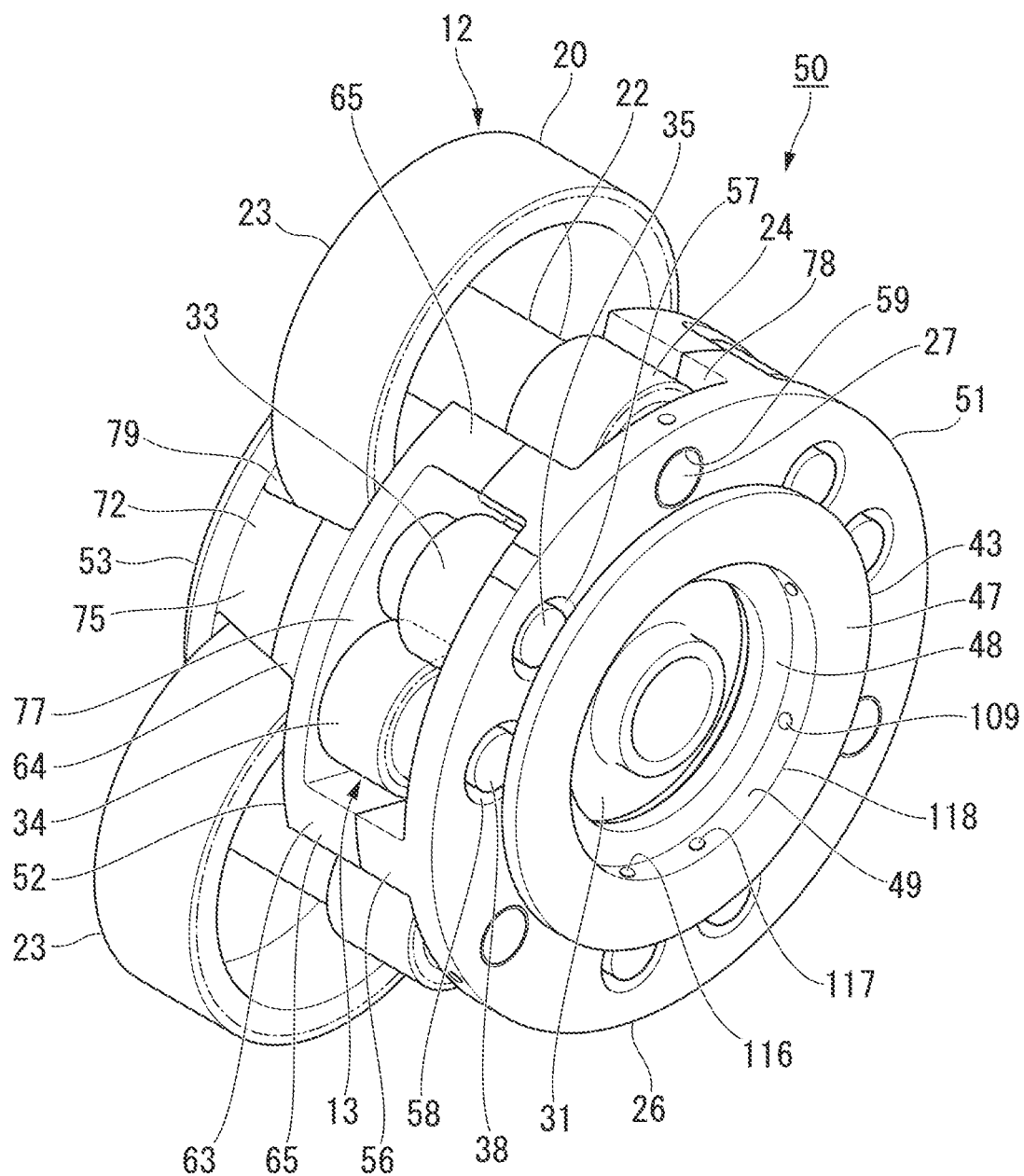
FIG. 6 is an assembled perspective view of a speed reduction and differential unit in the drive device of a vehicle according to the embodiment.

As illustrated in FIG. 6 the reduction gear 12 and the differential gear 13 which are described above are integrated to be one speed reduction and differential unit 50 excluding the ring gear 21 of the reduction gear 12. Then, for this unitization purpose, the above-described carrier 26 is divided into three members of a first carrier member 51, a second carrier member 52, and a third carrier member 53. In FIGS. 2 and 3, divided illustration of the carrier 26 is omitted and the carrier 26 illustrated as one member.

Figure 7:
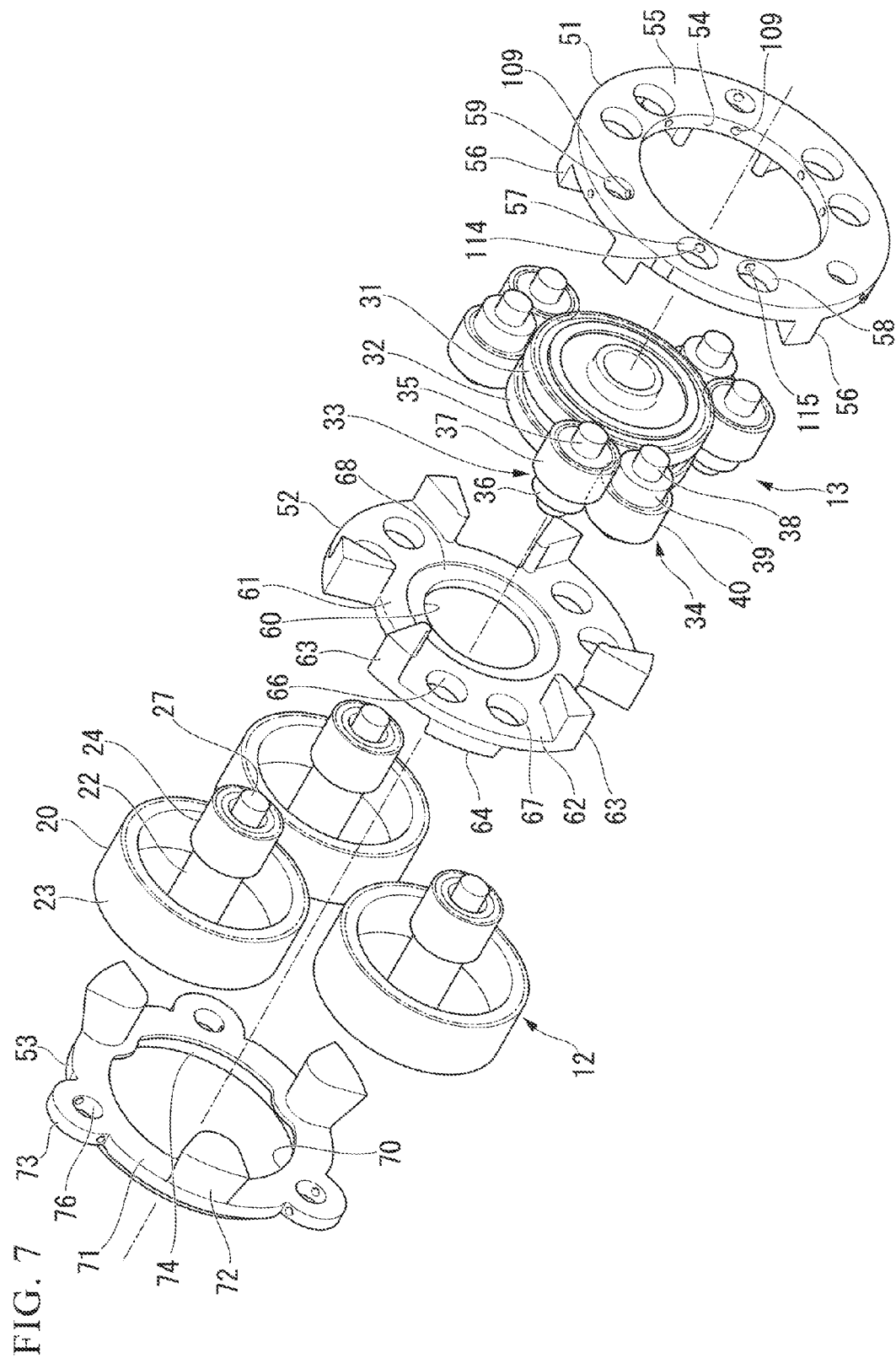
FIG. 7 is as exploded perspective view of the speed reduction and differential unit.
Figure 8:
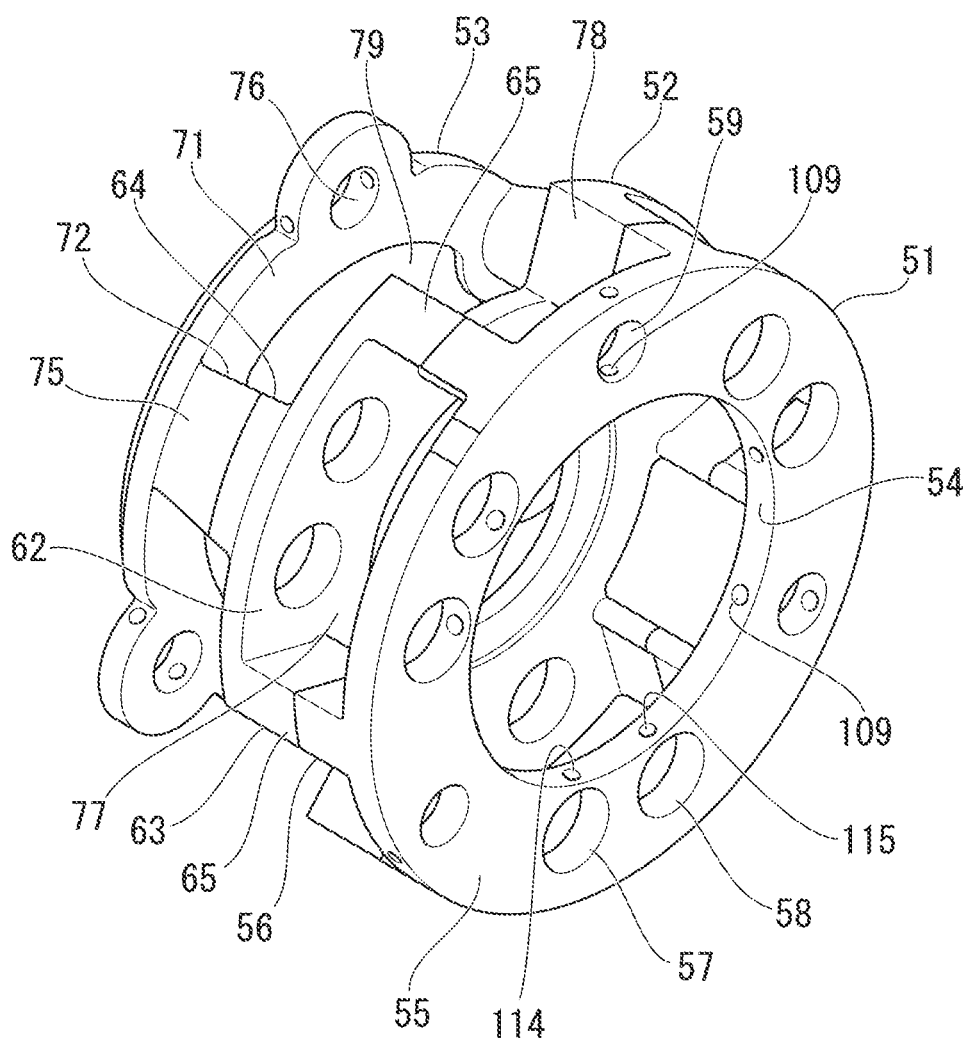
FIG. 8 is an assembled perspective view of a carrier of the speed reduction and differential unit.

FIG. 6 is a perspective view of the speed reduction and differential unit 50, and FIG. 7 is an exploded perspective view of the speed reduction and differential unit 50. FIG. 8 is a perspective view illustrating a state where the first carrier member 51, the second carrier member 52, and the third carrier member 53 are connected to form the integrated carrier 26.

The second carrier member 52 is interposed between the first carrier member 51 and the third carrier member 53, the first carrier member 51 is arranged on the right side of the second carrier member 52, and the third carrier member 53 is arranged on the left side of the second carrier member 52.

Then, the right pinion gear 33 and the left pinion gear 34 of the differential gear 13 are attached thereto in a state of being interposed between the first carrier member 51 and the second carrier member 52. The pinion 20 of the reduction gear 12 is attached thereto in a state of being interposed between she first carrier member 51 and the third carrier member 53.

The first carrier member 51 is configured to have a ring-shaped flange portion 55 having a circular opening 54 in the center, and six spacer projections 56 which are formed to project in a direction of moving close to the second carrier member 52 from a surface opposing the second carrier member 52 in the flange portion 55. The inner diameter of the opening 54 is set to be larger than the outer diameter of the right and left sun gears 31 and 32 of the differential gear 13.

In the flange portion 55, a through-hole 57 into which the pinion shaft 35 of the right pinion gear 33 of the differential gear 13 is inserted, and a through-hole 58 into which the pinion shaft 38 of the left pinion gear 34 is inserted form a pair. In this manner, three sets are disposed at an interval of 120 degrees in the circumferential direction. Furthermore, in the flange portion 55, a through-hole 59 into which the pinion shaft 27 of the reduction gear 12 is inserted is disposed at a circumferentially intermediate position between one set of the through-holes 57 adjacent to each other and the other set of the through-holes 58. A total of three of the through-holes 59 are also disposed at an interval of 120 degrees in the circumferential direction.

The six space projections 56 are arranged at the circumferentially intermediate position between the through-hole 59 and the adjacent through-hole 57, and at the circumferentially intermediate position between the through-hole 59 and the adjacent through-hole 58.

The second carrier member 52 is configured to have a ring-shaped disc portion 61 having a circular opening 60 in the center, three extending portion 62 extending radially outward from the disc portion 61 in a fan shape at an interval of 120 degrees in the circumferential direction, six spacer projections 63 formed to protect in a direction of moving close to the first carrier member 51 from both circumferential ends of a surface opposing the first carrier member 51 in the each extending portions 62, and three spacer projections 64 formed to project in a direction of moving close to the third carrier member 53 from the circumferential center of a surface opposing the third carrier member 53 in the each extending portions 62.

The inner diameter of the opening 60 is set to be smaller than the outer diameter of the right and left sun gears 31 and 32 of the differential gear 13. The outer diameter of the extending portion 62 is set to have the same dimension as the outer diameter of the flange portion 55 in the first carrier member 51.

A circumferential position of the spacer projection 63 projecting in the direction of moving close to the first carrier member 51 coincides with a circumferential portion of the spacer projection 56 of the first carrier member 51. As illustrated in FIGS. 6 and 8, a distal end surface of the spacer projection 56 of the first carrier member 51 and a distal end surface of the spacer projection 63 of the second carrier member 52 are caused to abut onto each other, thereby forming a connection portion 65.

The spacer projection 64 projecting in the direction of moving close to the third carrier member 53 is configured so that the outer diameter is gradually decreased as it goes toward the distal end.

In each of the extending portions 62, an insertion hole 66 into which the pinion shaft 35 of the right pinion gear 33 of the differential gear 13 is inserted, and an insertion hole 67 into which the pinion shaft 38 of the left pinion gear 34 is inserted are disposed by forming a pair.

In addition, on the surface opposing the first carrier member 51 in the disc portion 61, a recess 68 for arranging the above-described washer 42 is formed in a ring shape along an outer peripheral edge of the opening 60.

The third carrier member 53 is configured to have a ring-shaped flange portion 71 having a circular opening 70 in the center, three spacer projections 72 formed to project in the direction of moving close to the second carrier member 52 from the surface opposing the second carrier member 52 in the flange portion 71, three bulging portions 73 extending radially outward from an outer peripheral portion of the flange portion 71 at an interval of 120 degrees in the circumferential direction, and a cylindrical bearing support portion 74 extending in a direction of moving away from the second carrier member 52 along the axial direction from the outer peripheral portion of the flange portion 71.

The spacer projection 72 is arranged at an interval of 120 degrees in the circumferential direction of the flange portion 71, and the circumferential position of the three spacer projections 72 coincides with the circumferential positions of the spacer projection 64 of the second carrier member 52. Each of the spacer projections 72 is configured so that the outer diameter is gradually increased as it goes toward the distal end. As illustrated in FIGS. 6 and 8, the distal end surface of the spacer projection 62 of the second carrier member 52 and the distal end surface of the spacer projection 72 of the third carrier member 53 are caused to abut onto each other, thereby forming a connection portion 75.

A through-hole 76 into which the pinion shaft 27 of the reduction gear 12 is inserted is disposed in each of the bulging portions 73.

The above-described bearing 25 is fitted to the inner side of the bearing support portion 74. In this manner, one end of the carrier 26 is rotatably supported by the case 11.

As illustrated in FIG. 8, in a state where the first carrier member 51, the second carrier member 52, and the third carrier member 53 are connected to form the integrated carrier 26, the spacer projection 56 of the first carrier member 51 and the spacer projection 63 of the second carrier member 52 are connected to form the connection portion 65.

In this manner, a space enclosed by two adjacent connection portions 65, the flange portion 55 of the first carrier member 51, and the extending portion 62 of the second carrier member 52 becomes a pinion accommodation portion 77 for accommodating the right and left pinion gears 33 and 34 of the differential gear 13.

In addition, on a side circumferentially opposite tithe pinion accommodation portion 77 across the connection portion 65, a space enclosed by two adjacent connection portions 65 and the flange portion 55 of the first carrier member 51 becomes a pinion accommodation portion 78 for accommodating the second speed reduction pinion gear 24 of the reduction gear 12.

Furthermore, in a state of being integrated as the carrier 26, the spacer projection 64 of the second carrier member 52 and the spacer projection 72 of the third carrier member 53 are connected to form the connection portion 75. In this manner, a space enclosed by two adjacent connection portions 75, the disc portion 61 of the second carrier member 52 and the flange portion 71 of the third carrier member 53 becomes a pinion, accommodation portion 79 for accommodating the first speed reduction pinion gear 23 of the reduction gear 12.

Then, as illustrated in FIG. 6, in a state of being assembled as the speed reduction and differential unit 50, the right and left pinion gears 33 and 34 of the differential gear 13 are accommodated in the pinion accommodation portion 77 of the carrier 26. One end of the pinion shaft 35 of the right pinion gear 33 in the differential gear 13 is inserted into the through-hole 57 of the first carrier member 51, and the other end is inserted into the insertion hole 66 of the second carrier member 52. One end of the pinion shaft 38 of the left pinion gear 34 in the differential gear 13 is inserted into the through-hole 58 of the first carrier member 51, and the other end is inserted into the insertion hole 67 of the second carrier member 52.

In addition, the second speed reduction pinion gear 24 of the reduction gear 12 is accommodated in the pinion accommodation portion 78 of the carrier 26, and a portion of the first speed reduction pinion gear 23 of the reduction gear 12 is accommodated in the pinion accommodation portion 79 of the carrier 26. One end of the pinion shaft 27 or the reduction gear 12 is inserted into the through-hole 59 of the first carrier member 51, and the other end is inserted into the through-hole 76 of the third carrier member 53, thereby being fixed by pins.

In addition, the right and left sun gears 31 and 32 of the differential gear 13 are accommodated on the further radially inner side from the connection portion 65, which is between the first carrier member 51, and the second carrier member 52.

Means, for fixedly connecting the first carrier member 51 and the second carrier member 52 and means for fixedly connecting the second carrier member 52 and the third carrier member 53 may be welding, for example, and means such as fitting may be used.

In addition, as described above, the collar 43 is taxed to the opening 54 of the first carrier member 51.

The collar 43 includes a large diameter portion 47 which is arranged on the outer side of the right end surface of the first carrier member 51 and comes into surface contact with the right end surface, a small diameter portion 48 which is arranged in the left end portion inside the opening 54 of the first carrier member 51 and is fitted to the opening 54, and a connection portion 49 which is arranged on the right side inside the opening 54 of the first carrier member 51 and connects the large diameter portion 42 and the small diameter portion 48.

As illustrated in FIGS. 2, 3 and 6, on the outer peripheral portion of the large diameter portion 47, the outer diameter of the large diameter portion 47 is set to have a size which can close a portion of the through-holes 57 and 58 (radially inner side portion in the first carrier member 51) formed in the flange portion 55 of the first carrier member 51. The large diameter portion 47 is overlapped with a portion of the end surface of the pinion shafts 35 and 38 which are inserted into the through-holes 57 and 58, in the radial direction of the first carrier member 51. In this manner, the large diameter portion 47 is locked by the end surface of the pinion shafts 35 and 38, thereby preventing the pinion shafts 35 and 38 from slipping out from the through-holes 57 and 58. That is, in this embodiment, the outer peripheral portion of the large diameter portion 47 configures a locking portion with respect to the pinion shafts 35 and 38.

The inner diameter of the small diameter portion 48 is smaller than the outer diameter of the right and left sun gears 31 and 32 of the differential gear 13. The above-described washer 46 is interposed between the left end surface of the small diameter portion 48 and the right end surface of the right sun gear 31.

According to the drive device 1 configured as described above, the second speed reduction pinion gear 24 of the reduction gear 12, and the right pinion gear 33 and the left pinion gear 34 of the differential gear 13 are arranged out of phase in the rotation direction. The second speed reduction pinion gear 24, and the right pinion gear 33 and the left pinion gear 34 are arranged at positions in the axial direction so that they overlap with each other. Accordingly it is possible to decrease the outer diameter of a portion where the second speed reduction pinion gear 24 of the reduction gear 12, and the right pinion gear 33 and the left pinion gear 34 of the differential gear 13 are arrayed, and thus it is possible to shorten the dimension in the axial direction of the portion.

As a result, it is possible to miniaturize the drive device 1.

In the drive device 1, the revolving inner diameter of the second speed reduction pinion gear 24 of the reduction gear 12 is set to be larger than the outer diameter of the right sun gear 31 and the left sun gear 32 of the differential gear 13. Accordingly, it is possible to prevent radial interference between the second speed reduction pinion gear 24 and the right sun gear 31 and the left sun gear 32.

In addition, the revolving outer diameter of the right pinion gear 33 and the left pinion gear 34 of the differential gear 13 is set to be smaller than the inner diameter of the ring gear 21 of the reduction gear 12. Accordingly, it is possible to prevent radial interference between the right pinion gear 33 and the left pinion gear 34, and the ring gear 21.

In this manner, it is possible to reliably operate the reduction gear 12 and the differential gear 13.

In the drive device 1, the carrier 26 is configured to have three members of the first carrier member 51 on the right side, the second carrier member 52 in the center, and the third carrier member 53 on the left side. The right pinion gear 33 and the left pinion gear 34 of the differential gear 13 are rotatably attached in a state of being interposed between the first carrier member 51 and the second carrier member 52. The pinion 20 of the reduction gear 12 (first speed reduction pinion gear 23 and second speed reduction pinion gear 24) is rotatably attached in a state of being interposed between the first carrier member 51 and the third carrier member 53. Accordingly, the carrier 26 can be shared in use by the reduction gear 12 and the differential gear 13. As a result, the carrier 26 can be reduced in weight and can be miniaturized. Thus, the drive device 1 can be reduced in weight and can be miniaturized.

In the drive device 1, the collar 43 fixed to the opening 54 of the carrier 26 regulates the movement in the axial direction of the right sun gear 31 of the differential gear 13 by the small diameter portion 48 thereof cooperating with the washer 46. The outer peripheral portion of the large diameter portion 47 locks the end surface of the pinion shafts 35 and 38, thereby preventing the pinion shafts 35 and 38 from slipping out from the through-holes 57 and 58. As a result, there is no need to provide a dedicated member (for example, pin or clip) for regulating the movement in the axial direction of the pinion shafts 35 and 38, thereby allowing a reduced, number of components and a reduced number of manufacturing processes.

Incidentally, in the drive device 1, in order to enable the lubricating oil (lubricant) to be sufficiently supplied to the pinion 20 of the reduction gear 12 and the right and left pinion gears 33 and 34 of the differential gear 13, a special lubricating oil supply system is employed. Hereinafter, the lubricating oil supply system will be described in detail mainly with reference to FIGS. 9 and 10.

At illustrate in FIG. 2, a bottom portion of the gear chamber 11c of the case 11 is adapted to be a lower oil storage chamber 100, and can store a predetermined amount of the lubricating oil. The amount of the lubricating oil in the lower oil storage chamber 100 is set to be such an extent that when the first speed reduction pinion gear 23 of the reduction gear 12 revolves around the input shaft 18, a portion of the first speed reduction pinion gear 23 is soaked in the lubricating oil in the lower oil storage chamber 100 to scrape up the lubricating oil. The second speed reduction pinion gear 24 of the reduction gear 12 and the right and left pinion gears 33 and 34 of the differential gear 12 are adapted so as not to be soaked in the lubricating oil in the lower oil storage chamber 100.

Figure 9:
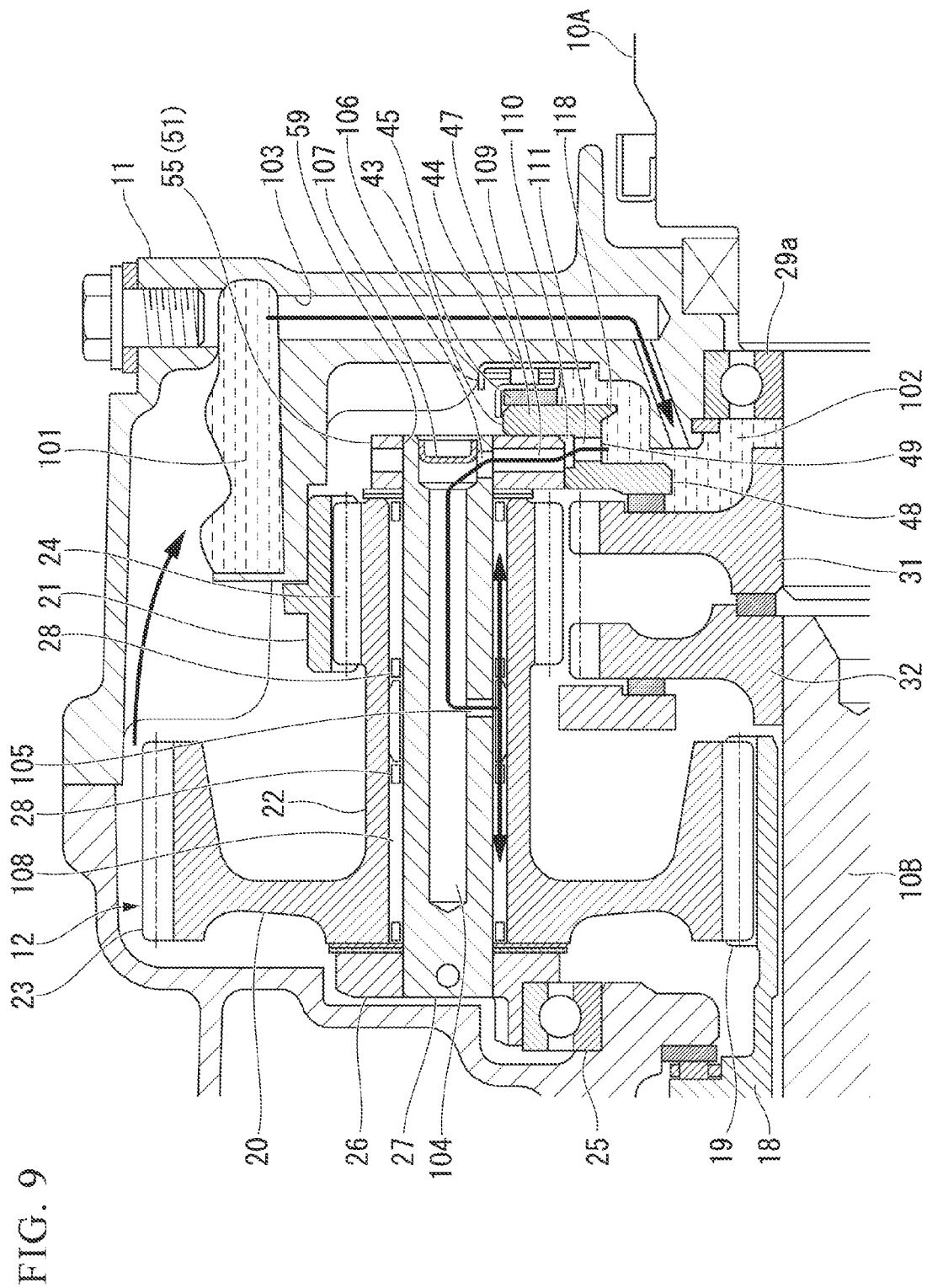
FIG. 9 illustrates a flow path of lubricating oil for the speed reduction mechanism.

As illustrated in FIG. 9, an upper oil storage chamber 101 which receives and stores a portion of the lubricating oil scraped up by the first speed reduction pinion gear 23 is formed in the upper portion of the right end portion of the gear chamber 11c.

Furthermore, as illustrated in FIG. 9, a central oil storage chamber 102 which is enclosed by an inner surface of the case 11, the right axle 10A and the bearing 29a, the right sun gear 31 of the differential gear 13, the collar 43, the thrust bearing 44 and the shim 45 is formed in the right end portion of the gear chamber 11c. Then, a passage 103 connecting the upper oil storage chamber 101 and the central oil storage chamber 102 is formed in a thickened portion configuring a right side wall portion of the case 11.

In contrast, as illustrated in FIG. 9, a passage 104 which is open on the right end surface of the pinion shaft 27 (end surface on a side where the pinion shaft 27 is inserted into the first carrier member 51) and extends to the vicinity of the left end surface along the axial direction, a passage 105 which is disposed in the substantially center in the axial direction of the pinion shaft 27 and penetrates in the radial direction, and a passage 106 which is disposed in a portion inserted into the through-hole 59 of the first carrier member 51 which is the right end portion of the pinion shaft 27 and penetrates in the radial direction are formed in the pinion shaft 27 of the reduction gear 12. The right end opening of the passage 104 is closed by a cap 107. The passage 105 which opens on the outer peripheral surface of the pinion shaft 27 is connected to a space 108 formed between the inner peripheral surface of the shaft portion 22 of the pinion 20 and the outer peripheral surface of the pinion shaft 27.

At illustrated in FIGS. 7 and 8, a through-hole 109 communicating with the through-hole 59 is disposed on the inner peripheral surface where the opening 54 is formed in the flange portion 55 of the first carrier member 51.

As illustrated on FIG. 9, the outer diameter of the connection portion 49 of the collar 43 is smaller than the inner diameter of the flange portion 55 of the first carrier member 51 (in other words, inner diameter of the opening 54). A ring-shaped space 110 is formed between the outer peripheral surface of the connection portion 49 and the inner peripheral surface of the flange portion 55.

As illustrated in FIGS. 8 and 9, a through-hole 111 penetrating, in the radial direction is disposed in the connection portion 49 of the collar 43.

In this embodiment, the passage 106 of the pinion shaft 27, the through-hole 109 of the first carrier member 51, and the through-hole 111 of the collar 43 are arranged at the same circumferential position. However, the space 110 is present between the carrier 26 and the collar 43. Accordingly the through-hole 111 of the collar 43 may not necessarily be arranged at the same circumferential position as the position of the passage 106 and the through-hole 109.

Figure 10:
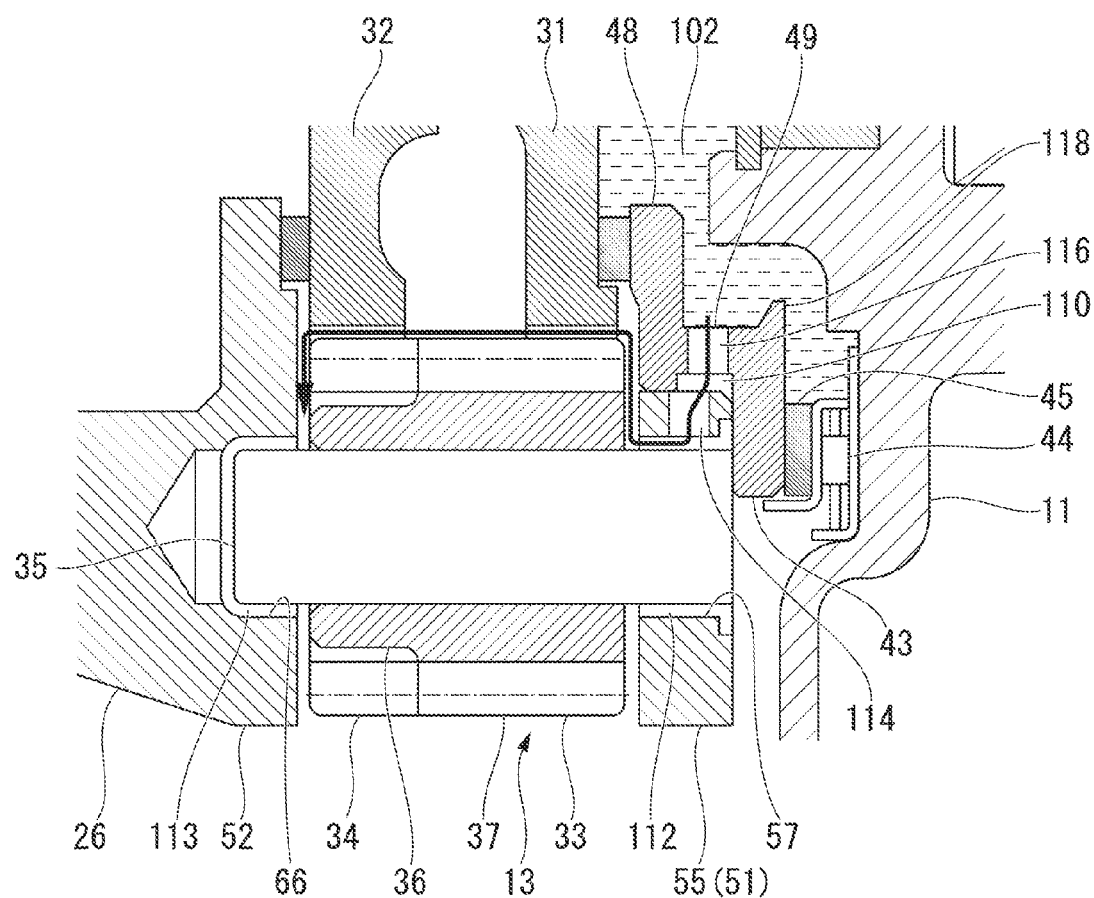
FIG. 10 illustrates a flow path of lubricating oil for the differential mechanism.

In addition, as illustrated in FIG. 10, gaps which enable the lubricating oil to be circulated are formed between the outer peripheral surface of the right and left pinion shafts 35 and 38 in the differential gear 13, the inner peripheral surface of the through-holes 57 and 58 of the first carrier member 51, and the inner peripheral surface of the insertion holes 66 and 67 of the second carrier member 52. In FIG. 10, for convenience of illustration, only a gap 112 formed between the outer peripheral surface of the pinion shaft 35 of the right pinion gear 33 and the inner peripheral surface of the through-hole 57 of the first carrier member 51 and a gap 113 formed between the outer peripheral surface of the pinion shaft 35 of the right pinion gear 33 and the inner peripheral surface of the insertion hole 66 of the second carrier member 52 are illustrated.

As illustrated in FIGS. 7 and 8 through-holes 114 and 115 which communicate with the through-holes 57 and 58 are disposed on the inner peripheral surface on which the opening 54 is formed in the flange portion 55 of the first carrier member 51.

As illustrated an FIGS. 6 and 10, through-holes 116 and 117 which are arranged at the same circumferential position as the position of the through-holes 114 and 115 of the first carrier member 51 and penetrate in the radial direction are deposed in the connection portion 49 of the collar 43. In FIG. 10, for convenience of illustration, only the through-holes 114 and 116 are illustrated. In this embodiment, the through-holes 116 and 117 of the collar 43 are arranged at the same circumferential position as the position of the through-holes 114 and 115 of the first carrier member 51. However, since the space 110 is present between the carrier 26 and the collar 43, the through-holes 116 and 117 of the collar 43 may not necessarily be arranged at the same circumferential position as the position of the through-holes 114 and 115 of the first carrier member 51.

As illustrated in FIG. 9, an overhanging portion 118 which protrudes radially inward further than the inner peripheral surface of the connection portion 49 and moves close to the inner surface of the case 11 is formed on a right end inner peripheral side of the large diameter portion 47 of the collar 43. The right end surface of the overhanging portion 118 is flush with the right end surface of the large diameter portion 47, and the left end surface of the overhanging portion 118 increases in diameter as it moves closer to the small diameter portion 48.

In the drive device 1 including the lubricating oil supply system configured as described above, when the first speed reduction pinion gear 23 of the reduction gear 12 revolves around the input shaft 18, the first speed reduction pinion gear 23 scrapes up the lubricating oil in the lower oil storage chamber 100 and conveys the lubricating oil to the upper oil storage chamber 101.

Then, as illustrated in FIG. 9, the lubricating oil stored in the upper oil storage chamber 101 is supplied to the central oil storage chamber 102 through the passage 103 of the case 11 by means of gravity. A force acting radially outward is applied to the lubricating oil inside the central oil storage chamber 102 by the rotation of the right sun gear 31 of the differential gear 13 rotating synchronously with the right axle 10A and the rotation of the collar 43 and the carrier 26 which rotate around the right axle 10A. Therefore, the lubricating oil inside the central oil storage chamber 102 sequentially passes through the through-hole 111 of the collar 43, the space 110 between the collar 43 and the first carrier member 51, the through-hole 109 of the first carrier member 51, and the passage 106 of the pinion shaft 27, and flows into the passage 104 inside the pinion shaft 27. Furthermore, the lubricating oil passes through the passage 105 of the pinion shaft 27 from the passage 104, and flows into the space 108 between the inner peripheral surface of the shaft portion 22 of the pinion 20 and the outer peripheral surface of the pinion shaft 27. In this manner, it is possible to actively supply the lubricating oil to the bearing 28 interposed between the shaft portion 22 and the pinion shaft 27.

The overhanging portion 118 protruding radially inward is disposed on the right end inner peripheral side of the large diameter portion 47 of the collar 43. Accordingly, the overhanging portion 118 serves as a resistance to prevent the lubricating oil in the central oil storage chamber 102 from flowing out to the right side further than the overhanging portion 118, and the overhanging portion 118 guide the lubricating out in the central oil storage chamber 102 so as to easily flow into the through-hole 111 of the collar 43.

In addition, as illustrated in FIG. 10, the lubricating oil inside the central oil storage chamber 102 sequentially passes through the through-hole 116 (117) of the collar 43, the space 110 between the collar 43 and the first carrier member 51, and the through-hole 114 (115) of the first carrier member 51, and flows into the gap 112 between the through-hole 57 (58) of the first carrier member 51 and the pinion shaft 35 (38). Furthermore, the lubricating oil is transmitted to the outer peripheral portion of the right pinion gear 33 (left pinion gear 34), and flows into the gap 113 between the insertion hole 66 (67) of the second carrier member 52 and the pinion shaft 35 (38). In this manner, it is possible to actively supply the lubricating oil to the rotating portion of the pinion shafts 35 and 38 and the carrier 26.

Another Embodiment

The invention is not limited to the above-described embodiment.

Figure 11:
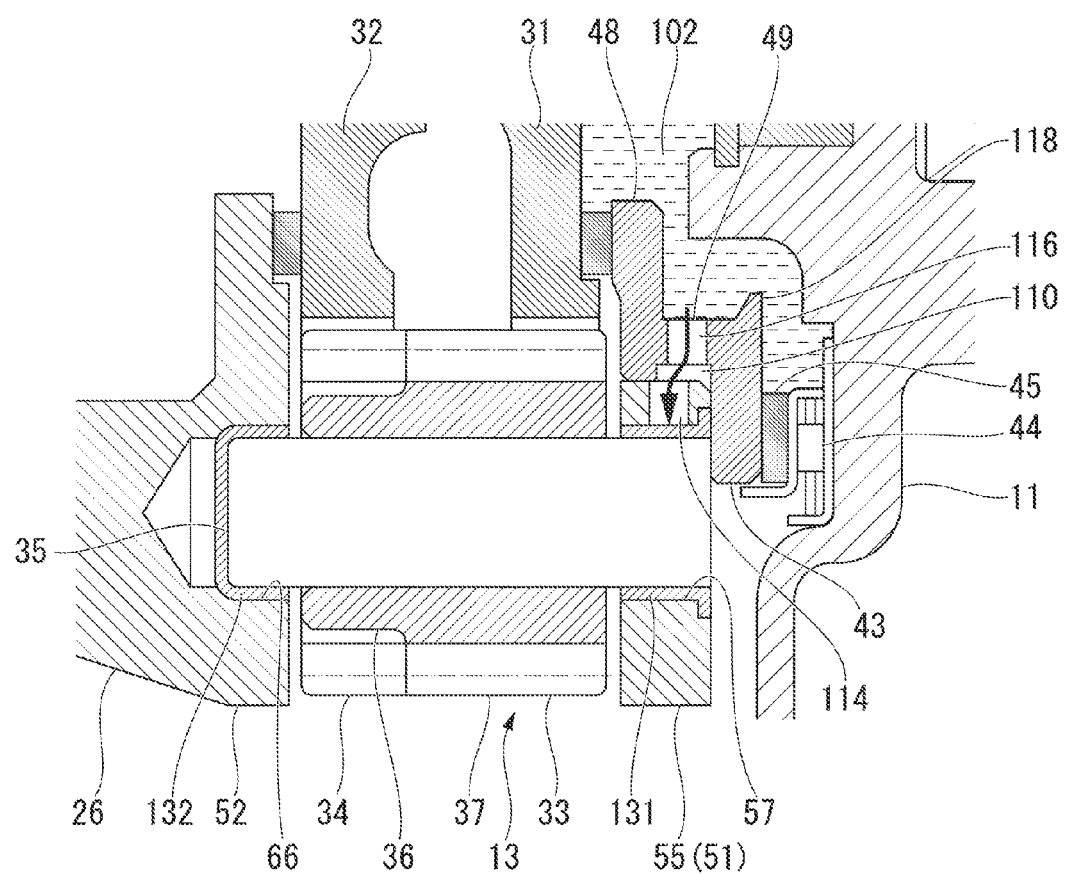
FIG. 11 illustrates a flow path of lubricating oil for a differential mechanism according to another embodiment.
Figure 12:
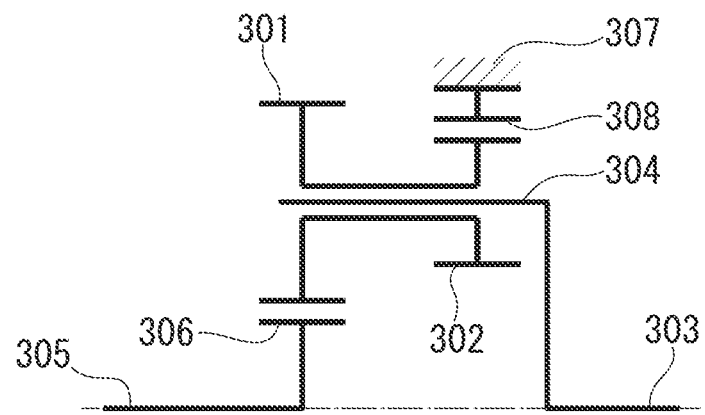
FIG. 12 is a schematic configuration diagram of a double pinion type planetary speed reduction mechanism in the related art.
Figure 13:
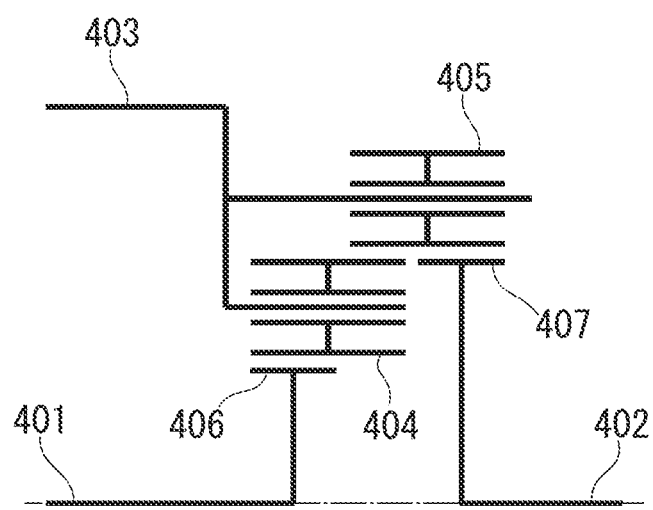
FIG. 13 is a schematic configuration diagram of a double pinion sun type planetary differential mechanism in the related art.

For example, as illustrated in FIG. 11, sleeves 131 and 132 may be disposed between the outer peripheral surface of the right and left pinion shafts 35 and 38 in the differential gear 13, and the inner peripheral surface of the through-holes 57 and 58 of the first carrier member 51 and the inner peripheral surface of the insertion holes 66 and 67 of the second carrier member 52. In FIG. 11, for convenience of illustration, only the sleeves 131 and 132 are illustrated which are disposed in both end portions of the pinion shaft 35 of the right pinion gear 33 and are accommodated in the through-hole 57 of the first carrier member 51 and the insertion hole 66 of the second carrier member 52.

In this case, the lubricating oil inside the central oil storage chamber 102 sequentially passes through the through-hole 116 of the collar 43, the space 110 between the collar 43 and the first carrier member 51, and the through-hole 114 of the first carrier member 51. In this manner, it is possible to actively supply the lubricating oil to the rotating portion of the inner peripheral surface of the through-hole 57 of the first carrier member 51 and the outer peripheral surface of the sleeve 131.

In addition, although not illustrated, a groove which is formed along the axial direction and is open on an end surface of the right pinion gear 33 side may disposed on the inner peripheral surface of the sleeve 131, the groove and the through-hole 114 of the first carrier member 51 may be allowed to communicate with each other, and the lubricating oil may be allowed to flow into the grove. If configured in this way, it is possible to guide the lubricating oil flowing into the through-hole 114 of the first carrier member 51 to the outer peripheral portion of the right pinion gear 33 through the grove. Furthermore, it is possible to guide the fabricating oil to the rotating portion of the sleeve 132.

In the above-described embodiment, both of the right and left pinion gears 33 and 34 of the differential gear 13 are arranged to be overlapped at a position in the axial direction with the second speed reduction pinion gear 24 of the reduction gear 12. However, only one of the right and left pinion gears 33 and 34 of the differential gear 13 may be arranged to be overlapped at a position in the axial direction with the second speed reduction pinion gear 24 of the reduction gear 12. Even in this case, the invention is achieved. Even in this case, it is possible to shorten the dimension in the axial direction of the drive device for a vehicle.

In the above-described embodiment, in the reduction gear 12, the pinion 20 is rotatably attached to the pinion shaft 27 fixed to the carrier 26. However, the pinion 20 and the pinion shaft 27 may be integrated with each other and the pinion shaft 27 may be rotatably attached to the carrier 26.

In addition, in the above-described embodiment, in the differential gear 13, the right and left pinion gears 33 and 34 are respectively fixed to the pinion shafts 35 and 38, and the pinion shafts 35 and 38 are rotatably attached to the carrier 26. However, the pinion shafts 35 and 38 are fixed to the carrier 26, and the pinion gears 33 and 34 may be rotatably attached in the pinion shafts 35 and 38.

In the above-described embodiment, the electric motor 2 is used as the drive source of the drive device for a vehicle. However, the drive source is not limited to the electric motor but may be an internal combustion engine. Alternatively, the drive source may be a hybrid system which uses both of the internal combustion engine and the electric motor as the drive source. Furthermore, the drive device for a vehicle is not limited to use in a four-wheel drive vehicle.

REFERENCE SIGNS LIST 1 drive device for vehicle
10A right axle (first drive shaft)
10B left axle (second drive shaft)
11 case
12 reduction gear (speed reduction mechanism)
13 differential gear (differential mechanism)
18 input shaft
19 sun gear (input sun gear)
21 ring gear
23 first speed reduction pinion gear
24 second speed reduction pinion gear
26 carrier
31 right sun gear (first sun gear)
32 left sun gear (second sun gear)
33 right pinion gear (first pinion gear)
34 left pinion gear (second pinion gear)
35 pinion shaft
38 pinion shaft
43 collar
47 large diameter portion (locking portion)
51 first carrier member
52 second carrier member
53 third carrier member

The invention claimed is:
1. A drive device for a vehicle, comprising:
a first drive shaft and a second drive shaft whose axial ends are caused to oppose each other so as to be coaxially arranged;
a differential mechanism that has a first sun gear which is connected to the first drive shaft, a second sun gear which is connected to the second drive shaft, a first pinion gear which meshes with the first sun gear, a second pinion gear which meshes with the second sun gear and the first pinion gear, and a carrier which rotatably supports the first pinion gear and the second pinion gear;
a speed reduction mechanism that has an input sun gear which is connected to an input shaft, a first speed reduction pinion gear which meshes with the input sun gear and is rotatably supported by the carrier, a second speed reduction pinion gear which is connected to the first speed reduction pinion gear and is rotatably supported by the carrier, and a ring gear which meshes with the second speed reduction pinion gear; and
a case that encloses the differential mechanism and the speed reduction mechanism which are coaxially arranged, that rotatably supports the carrier, and to which the ring gear is fixed,
wherein the second speed reduction pinion gear of the speed reduction mechanism and the first pinion gear and the second pinion gear of the differential mechanism are arranged out of phase in a rotation direction, and the second speed reduction pinion gear of the speed reduction mechanism and the first pinion gear and the second pinion gear of the differential mechanism are arranged at a position in an axial direction so that at least any one of the first pinion gear and the second pinion gear of the differential mechanism overlaps with the second speed reduction pinion gear of the speed reduction mechanism and the ring gear.
2. The drive device for a vehicle according to claim 1, wherein a revolution outer diameter of the first pinion gear and the second pinion gear of the differential mechanism is smaller than an inner diameter of the ring gear of the speed reduction mechanism, and a revolution inner diameter of the second speed reduction pinion gear of the speed reduction mechanism is larger than an outer diameter of the first sun gear and the second sun gear of the differential mechanism.

3. The drive device for a vehicle according to claim 2,
wherein the first sun gear and the second sun gear of the differential mechanism are arranged at a position in the axial direction so that the first sun gear and the second sun gear of the differential mechanism overlap with the second speed reduction pinion gear of the speed reduction mechanism and the ring gear.

4. The drive device for a vehicle according to claim 3,
wherein a meshing part of a first gear portion with a second gear portion is arranged between a meshing part of the first gear portion with the first sun gear and a meshing part of the second gear portion with the second sun gear in the axial direction, the first gear portion being a gear portion of the first pinion gear of the differential mechanism and the second gear portion being a gear portion of the second pinion gear.

5. The drive device for a vehicle according to claim 4,
wherein the second sun gear is arranged in the axial direction at a position such that the second sun gear overlaps with a portion of the first pinion gear of the differential mechanism in which the first gear portion is not arranged, and
the first sun gear is arranged in the axial direction at a position such that the first sun gear overlaps with a portion of the second pinion gear of the differential mechanism in which the second gear portion is not arranged.

6. The drive device for a vehicle according to claim 2,
wherein a meshing part of a first gear portion with a second gear portion is arranged between a meshing part of the first gear portion with the first sun gear and a meshing part of the second gear portion with the second sun gear in the axial direction, the first gear portion being a gear portion of the first pinion gear of the differential mechanism and the second gear portion being a gear portion of the second pinion gear.

7. The drive device for a vehicle according to claim 6,
wherein the second sun gear is arranged in the axial direction at a position such that the second sun gear overlaps with a portion of the first pinion gear of the differential mechanism in which the first gear portion is not arranged, and
the first sun gear is arranged in the axial direction at a position such that the first sun gear overlaps with a portion of the second pinion gear of the differential mechanism in which the second gear portion is not arranged.

8. The drive device for a vehicle according to claim 7,
wherein the first pinion gear and the second pinion gear of the differential mechanism are formed in a substantially same dimension, and are arranged so as to be bilaterally symmetrical to each other.

9. The drive device for a vehicle according to claim 6,
wherein the first pinion gear and the second pinion gear of the differential mechanism are formed in a substantially same dimension, and are arranged so as to be bilaterally symmetrical to each other.

10. The drive device for a vehicle according to claim 2,
wherein the carrier has a first carrier member, a second carrier member, and a third carrier member, and the second carrier member is configured to be interposed between the first carrier member and the third carrier member,
wherein the first pinion gear and the second pinion gear of the differential mechanism are rotatably attached to the first carrier member and the second carrier member by being interposed therebetween, and
wherein the first speed reduction pinion gear and the second speed reduction pinion gear of the speed reduction mechanism are rotatably attached to the first carrier member and the third carrier member by being interposed therebetween.

11. The drive device for a vehicle according to claim 2, further comprising:
a collar that is fixed to one end surface of the carrier so as to be radially overlapped with the first sun gear in order to regulate a movement of the first sun gear in the axial direction,
wherein the collar includes a locking portion which is radially overlapped with a shaft of the first pinion gear and the second pinion gear in the differential mechanism on an outward side of the axial direction of the shaft.

12. The drive device for a vehicle according to claim 1,
wherein the first sun gear and the second sun gear of the differential mechanism are arranged at a position in the axial direction so that the first sun gear and the second sun gear of the differential mechanism overlap with the second speed reduction pinion gear of the speed reduction mechanism and the ring gear.

13. The drive device for a vehicle according to claim 12,
wherein a meshing part of a first gear portion with a second gear portion is arranged between a meshing part of the first gear portion with the first sun gear and a meshing part of the second gear portion with the second sun gear in the axial direction, the first gear portion being a gear portion of the first pinion gear of the differential mechanism and the second gear portion being a gear portion of the second pinion gear.

14. The drive device for a vehicle according to claim 13,
wherein the second sun gear is arranged in the axial direction at a position such that the second sun gear overlaps with a portion of the first pinion gear of the differential mechanism in which the first gear portion is not arranged, and
the first sun gear is arranged in the axial direction at a position such that the first sun gear overlaps with a portion of the second pinion gear of the differential mechanism in which the second gear portion is not arranged.

15. The drive device for a vehicle according to claim 1,
wherein a meshing part of a first gear portion with a second gear portion is arranged between a meshing part of the first gear portion with the first sun gear and a meshing part of the second gear portion with the second sun gear in the axial direction, the first gear portion being a gear portion of the first pinion gear of the differential mechanism and the second gear portion being a gear portion of the second pinion gear.

16. The drive device for a vehicle according to claim 15,
wherein the second sun gear is arranged in the axial direction at a position such that the second sun gear overlaps with a portion of the first pinion gear of the differential mechanism in which the first gear portion is not arranged, and
the first sun gear is arranged in the axial direction at a position such that the first sun gear overlaps with a portion of the second pinion gear of the differential mechanism in which the second gear portion is not arranged.

17. The drive device for a vehicle according to claim 16, wherein the first pinion gear and the second pinion gear of the differential mechanism are formed in a substantially same dimension, and are arranged so as to be bilaterally symmetrical to each other.

18. The drive device for a vehicle according to claim 15, wherein the first pinion gear and the second pinion gear of the differential mechanism are formed in a substantially same dimension, and are arranged so as to be bilaterally symmetrical to each other.

19. The drive device for a vehicle according to claim 1, wherein the carrier has a first carrier member, a second carrier member, and a third carrier member, and the second carrier member is configured to be interposed between the first carrier member and the third carrier member,
wherein the first pinion gear and the second pinion gear of the differential mechanism are rotatably attached to the first carrier member and the second carrier member by being interposed therebetween, and
wherein the first speed reduction pinion gear and the second speed reduction pinion gear of the speed reduction mechanism are rotatably attached to the first carrier member and the third carrier member by being interposed therebetween.

20. The drive device for a vehicle according to claim 1, further comprising:
a collar that is fixed to one end surface of the carrier so as to be radially overlapped with the first sun gear in order to regulate a movement of the first sun gear in the axial direction,
wherein the collar includes a locking portion which is radially overlapped with a shaft of the first pinion gear and the second pinion gear in the differential mechanism on an outward side of the axial direction of the shaft.

* * * * *